United States Patent [19]

Creamer

[11] Patent Number: 4,904,516

[45] Date of Patent: Feb. 27, 1990

[54] PHENOL-FORMALDEHYDE RESIN SOLUTION CONTAINING WATER SOLUBLE ALKALINE EARTH METAL SALT

[76] Inventor: Albert W. Creamer, c/o CertainTeed Corporation, P.O. Box 860, Valley Forge, Pa. 19482

[21] Appl. No.: 142,946

[22] Filed: Jan. 12, 1988

[51] Int. Cl.[4] .............................................. C08G 8/10

[52] U.S. Cl. .................................... 528/129; 528/140; 528/143; 528/162; 528/163; 528/230; 528/234; 528/256; 528/257; 528/247; 525/480; 525/485; 525/486; 525/495; 525/498; 525/505; 524/541

[58] Field of Search ............... 528/129, 140, 143, 162, 528/163, 230, 234, 256, 257, 247; 525/480, 485, 486, 495, 498, 505; 524/541

[56] References Cited

U.S. PATENT DOCUMENTS

| | | | |
|---|---|---|---|
| 2,676,898 | 4/1954 | Folger | 428/221 |
| 2,937,159 | 5/1960 | McKay | 524/252 |
| 3,207,652 | 9/1965 | Shannon | 521/181 |
| 3,432,453 | 3/1969 | Gladney | 524/596 |
| 3,624,247 | 11/1971 | Gladney | 524/594 |
| 3,704,199 | 11/1972 | Smucker | 428/221 |
| 3,932,334 | 1/1976 | Deuzeman et al. | 524/541 |
| 3,956,205 | 5/1976 | Higginbottom | 524/541 |
| 4,131,582 | 12/1978 | Kako et al. | 524/541 |
| 4,408,003 | 10/1983 | Robinson | 524/364 |
| 4,650,825 | 3/1987 | Jellinek | 524/596 |
| 4,663,418 | 5/1987 | Jellinek | 528/140 |
| 4,680,058 | 7/1987 | Shimuzu | 106/23 |
| 4,757,108 | 6/1986 | Walisser | 524/596 |

FOREIGN PATENT DOCUMENTS 905393 9/1962 United Kingdom .

OTHER PUBLICATIONS

R. W. Martin, *The Chemistry of Phenolic Resins* (John Wiley & Sons, Inc. New York 1956), pp. 88–97.

*Primary Examiner*—John Kight
*Assistant Examiner*—Samuel A. Acquah

[57] ABSTRACT

A process for preparing a water soluble phenol-formaldehyde resole resin having improved storage stability employs a calcium compound to catalyze the condensation reaction which occurs under basic conditions. Sulfamic acid is used to neutralize the resole solution, yielding a soluble calcium salt which will not settle out of the solution or clog transfer lines or spray nozzles as may a calcium salt precipitated during the neutralization. Glass fiber insulation produced using a binder prepared with the aqueous resole solution shows enhanced thickness recovery and lower odor potential.

18 Claims, No Drawings

PHENOL-FORMALDEHYDE RESIN SOLUTION CONTAINING WATER SOLUBLE ALKALINE EARTH METAL SALT

BACKGROUND OF THE INVENTION

1. Field of the Invention

The present invention relates generally to resins for use in preparing binders for products formed from mineral fibers, and more specifically, to processes for preparing water-soluble phenol-formaldehyde resins, binders for glass fiber including such resins, and glass fiber products formed using such binders.

2. Brief Description of the Prior Art

Phenolic resins are well known for use in preparing binders for glass fiber products such as thermal and acoustic insulation, glass fiber mats for rein forcement and printed circuit For example, U.S. Pat. No. 3,932,334 discloses phenol-formaldehyde resole resins which are both water soluble and thermosettable, as well as binder systems from such resoles for use in bonding glass fibers to prepare articles such as insulative batts. Typically, in preparing the binder in addition to the water soluble phenolformaldehyde resin, other components such as other resins, monomers, and additives are also included. Substantial proportions of nitrogenous resins, such as urea-formaldehyde and melamine-formaldehyde resins, and/or monomers such as urea, melamine and dicyandiamide, which are condensible with the phenol-formaldehyde resins can be included. Typically, after the binder is applied the glass fibers heat is applied to volatilize the aqueous solvent and to cure the binder.

In practice, because the binder has a relatively short storage life (on the order of hours), it is usually prepared shortly before use at the glass fiber production facility. On the other hand, the water soluble phenol-formaldehyde resin can have somewhat greater storage stability (on the order of days or weeks), and it is highly desirable to prepare the phenol-formaladehyde resin where the highly reactive raw materials are available and subsequently to transport the resin to the glass fiber production facility rather than ship phenol and formaldehyde to the manufacturing site.

The phenol-formaldehyde resin is prepared by reaction between phenol and formaldehyde in aqueous solution under basic conditions. A catalyst is employed to promote the methylolation of phenol. Catalysis by alkali or alkaline earth metal bases is well known, see, for example, U.S. Patent 2,676,898. It is known that use of calcia yields a number of favorable result, such as improved resinification efficiency and increased application efficiency and curability of binders formulated with such resins. While other alkaline earth metal bases, principally barium hydroxide such as discussed in British Patent 905,393, have been used as catalysts in preparing phenol-formaldehyde resins, use of calcium bases is strongly favored by cost considerations.

In preparing the phenol-formaldehyde resin the basic aqueous solution is typically neutralized after the desired extent of resinification has been achieved. A significant disadvantage encountered in using calcium bases for catalyzing the reaction of phenol and formaldehyde to form resole resins has been the low aqueous solubility of calcium salts formed when the reaction mixture is neutralized. U.S. Patent 3,624,247 discloses removal of calcium ions from phenol-formaldehyde resin solutions by addition of an ammonium salt including an anionic species which forms an insoluble precipitate with calcium. However, while the neutralization can be carried out in a manner which promotes formation of fine particulates of insoluble calcium salts, the presence of any such particulate is undesirable. The particulate may settle out of the resole solution during storage, complicating transfer of the resole solution and preparation of the binder. A significant problem may be encountered should the particulate clog lines or nozzles used to apply the binder to the glass fibers. While the particulate could in theory be removed by physical means, for example filtration, centrifugation, decantation or the like, such additional preparative steps could significantly increase the cost of the resole product. In addition, physical separation of the precipitate would be likely to reduce the yield of resole resin and produce an uncured resole-precipitate byproduct which would have to be disposed of in an environmentally sound manner. A simpler resolution of the problem is needed.

Recently, it has been proposed to adjust the pH of the resin solution to between 7.5 and 11.0 and to slowly add sulfate in the form of sulfuric acid or ammonium sulfate to form a complex with the calcium ions. According to the disclosure of U.S. Pat. No. 4,650,825, the complex is stable for at least several hours, permitting preparation of a binder with the resole solution and subsequent application of the binder to glass fiber to form a bonded product. However the stability of the calcium complex is limited, and it is impractical to prepare a phenol-formaldehyde resin by this method off-site and to subsequently ship the resin to the production facility where it will be consumed, as precipitation is likely to occur before the binder can be applied. A longer-lived solution to the problem is desirable.

SUMMARY OF THE INVENTION

The present invention provides a process for preparing a water soluble resole resin having improved storage stability for subsequent use in preparing a binder for mineral fiber, such as glass fiber or rock wool for thermal or acoustic insulation for residential or commercial use, or glass fiber mat for roofing products, batting separators, reinforced plastics, etc. The water soluble resole resin can be formed by condensation of phenol and formaldehyde. The process provides an aqueous solution of a water soluble resole resin containing a water soluble calcium salt rather than a calcium salt precipitate. Because the calcium salt is water soluble, the resole resin solution can be prepared at site where phenol and formaldehyde are readily available, and thereafter shipped to a distant second site where it is consumed, without experiencing calcium salt precipitation in the interim, even though several weeks may elapse between preparation of the resin and its use.

The process comprises preparing an aqueous mixture of the aldehyde and the phenol in a molar ratio of from about 1.5:1 to 5.0:1, and adding an alkaline earth metal compound, preferably selected from barium and calcium, to the aqueous mixture in an amount effective to catalyze the reaction between the aldehyde and the phenol. Calcium compounds, such as calcium hydroxide and calcium oxide, are especially preferred catalysts. The process further comprises reacting the aldehyde and the phenol under basic conditions and in the presence of the alkaline earth metal compound to form an aqueous solution of a phenol-aldehyde resole resin, and adding sulfamic acid to the aqueous solution to provide a resin solution having improved stability. The sulfamic acid is added in an amount sufficient to provide a pH from about 1 to 8, and preferably in an amount sufficient to provide a pH of from about 4 to 8, and more preferably from about 6.0 to 7.0.

If desired the pH can be first adjusted to provide a highly acidic solution, for example, a pH of about 1, using sulfamic acid. The pH can then be subsequently adjusted to provide a neutral solution (e.g., pH about 7 or greater). The acidic solution can be neutralized by addition of a base, such as a mono-, di-, or tri-alkanolamine.

In the process the calcium compound is preferably added in an amount from about 1% to 10% by weight, calculated as calcium oxide on the weight of phenol, and more preferably in amount from about 3% to 6% on the same basis. When phenol and formaldehyde are employed, it is preferred that the molar ratio of formaldehyde to phenol be from about 3.2:1 to 3.8:1.

In a presently preferred embodiment of the process of the invention, the temperature of an aqueous mixture of formaldehyde and phenol is maintained at a first temperature from about 40° C. to 50° C. as the catalyst is added, the temperature then being allowed to rise to a second temperature of from about 60° C. to 80° C. within about 30 minutes. The temperature is preferably maintained at the second temperature until the free formaldehyde content declines to a level of about 10% by weight of the reaction mixture and the sulfamic acid is subsequently added. If solid sulfamic acid is to be added, the reaction mixture is preferably first cooled to between 30° C. and 40° C.

Neutralization of the basic aqueous mixture of resole resin with sulfamic acid provides an improved aqueous solution of resole resin prepared by basic alkaline earth metal catalysis and having an alkaline earth metal salt dissolved therein. The aqueous resole solution need not be filtered or otherwise treated before use to remove precipitate formed by reaction between the alkaline earth metal cation and the anion of the neutralizing agent or other anionic species present in the solution. The precipitate-free solution can be stored for up to several weeks without either formation of a significant amount of precipitate or substantial further undesired condensation of the resole resin. During this time the resole solution can be shipped from a central production facility to mineral fiber manufacturing sites where a binder incorporating the resole solution can be prepared and applied.

In preparing the binder, the aqueous solution of the resole resin is preferably reacted with at least one nitrogenous reactant selected from urea, ammonia, ammonium salts, dicyandiamide, melamine and aminoplast resins. Reaction with urea is especially preferred, and the nitrogenous reactant is preferably added in an amount effective to react with substantially all residual formaldehyde. In present embodiments, nitrogenous reactants are generally added in amounts ranging from 20% to 75% by weight of total solids, with 20% to 50% being the preferred range.

The binder, which in addition to the resole resin and the nitrogenous reactant can also include other components such as mineral oil lubricant and silane adhesion promoters, can be applied by conventional methods to mineral fibers such as glass fibers, rock wool, etc., and cured thermally. The resulting products can be used for thermal or acoustic insulation, for reinforcing roofing products or plastics, such as printed circuit board stock, or for similar purposes, depending on the characteristics of the glass fibers themselves, the thickness and density of the fiber mat, the proportion of binder to fiber, and like factors.

The use of aqueous solutions of phenol-formaldehyde resole resins prepared by the present process is especially advantageous in manufacturing mineral fiber batts and rolls for use as thermal insulation and such products unexpectedly exhibit greater thickness than those bonded by prior art binders. The thermal insulation, which is typically compressed before shipment to reduce cost and increase handling convenience, is allowed to expand prior to installation. The greater recovery provides a thicker installed product and consequently reduced thermal conductivity and greater thermal insulation (R value).

DETAILED DESCRIPTION OF THE PREFERRED EMBODIMENTS

The water-soluble resole resin produced by the process of the present invention can be of the phenol-formaldehyde type. The phenol can be commercial grade phenol and the formaldehyde employed can be a commercial grade material. Commercial grade aqueous phenol solutions are often stored at a temperature of about 45° C., at which temperature the water/phenol mixture forms a true binary solution, and consequently this temperature is a convenient starting temperature for the preparation of the resin. In addition to phenol itself, other hydroxy-functional aromatic compounds can be employed, or used in lieu of phenol. Similarly, other reactive aldehydes can be substituted in whole or in part for formaldehyde to produce the aqueous solution of water soluble resole resin. The preparation of such resole resins is reviewed and described in R. W. Martin, *The Chemistry of Phenolic Resins* (John Wiley & Sons, Inc., New York 1956) at 88–97.

A base catalyzed condensation of the phenol and the aldehyde is used to prepare the resin. The reaction, which is exothermic, is initiated after mixing the phenol and the aldehyde by addition of the catalyst. The proportion of phenol to the aldehyde is selected to yield a resole-type resin (stoichiometric excess of formaldehyde) when formaldehyde and phenol are used, the molar ratio of formaldehyde to phenol preferably being from about 1.5:1 to 5.0:1, and more preferably from about 3.2:1 to 3.8:1.

The catalyst used in the process includes at least one alkaline earth metal compound. Examples of alkaline earth metal compounds which can be used include compounds of calcium, barium and strontium. Presently, calcium oxide and calcium hydroxide, are the preferred catalysts with barium hydroxide octahydrate as the next best choice.

Adjustment o the pH of the aqueous reaction medium can be achieved most simply by addition of a basic compound of an alkaline earth metal, such as calcium hydroxide, barium hydroxide and calcium monohydrogen phosphate, or the like, or by addition of an alkaline earth metal compound forming a basic solution upon addition to an aqueous medium, such as does calcium oxide. However, this has the disadvantage of fixing the pH based on the level of catalyst used. If desired, the pH of the aqueous reaction mixture can be varied independently by addition of other inorganic or organic bases or acids. Preferably, the pH of the reaction mixture is adjusted to from about 8 to 9.5 by addition of a basic alkaline earth metal compound, and independent adjustment of the pH of the aqueous reaction is not required.

If such independent adjustment is practiced, it is desirable to use alkaline earth metal bases rather than alkali metal bases such as sodium hydroxide and potassium hydroxide, in order to improve the moisture resistance of binders prepared with the resin.

When a basic calcium compound is employed, it is preferably added in an amount from about 3% to 6% by weight, calculated as calcium oxide on the weight of phenol.

The condensation reaction between a phenol and an aldehyde is exothermic. Preferably, the temperature of the reaction mixture is controlled after the reaction between the phenol and the aldehyde is initiated by cooling the reaction mixture as needed. In a presently preferred embodiment of the process of this invention an aqueous mixture of phenol and formaldehyde is initially maintained at a first temperature of from about 40° C. to 50° C. as the catalyst is added and the desired basic pH is attained. In this case the initial concentration of phenol in the reaction mixture is about 30% by weight of the reaction mixture and the initial concentration of the formaldehyde in the reaction is about 35% by weight on the same basis. Commercial aqueous phenol solutions are typically maintained at a temperature of about 45° C. to avoid phase separation and keep the phenol in solution. After the catalyst has been added and the exothermic condensation reaction between phenol and formaldehyde has begun, the temperature is preferably permitted to rise to a second temperature of from about 60° C. to 80° C. within about 30 minutes. As is well known in the resin production art, the magnitude of the exotherm experienced depends on such variables as the concentration of the reactants, the nature and concentration of the catalyst added, the pH of the aqueous reaction mixture and the volume of the reaction mixture, as well as such factors as the rate of cooling of the reaction vessel or resin kettle, the efficiency of cooling, the reaction vessel design, and the like. In the presently preferred embodiment, the reaction mixture is maintained at this second temperature until the free formaldehyde content declines to about 10% by weight of the reaction mixture, as determined by extrapolation of a prior measurement of free formaldehyde content using a calibration curve. At this point, the reaction mixture is neutralized by addition of sulfamic acid.

The sulfamic acid can be dissolved in water to form an aqueous solution for convenient handling and mixing. For example, an aqueous sulfamic acid solution having a concentration of about 25% by weight can be used to neutralize the reaction mixture. Preferably, the sulfamic acid is added to the reaction mixture in an amount sufficient to adjust the acidity of the solution to a pH of from about 4 to 8 and preferably from about 6.0 to 7.0. In the case of the presently preferred embodiment, an aqueous solution of sulfamic acid can in general be added directly to the reaction mixture at the second temperature. However, if solid sulfamic acid is to be added directly to the reaction mixture, it is preferable first to cool the reaction mixture to a predetermined temperature of from about 30° C. to 40° C., because the dissolution of sulfamic acid in an aqueous medium is itself exothermic. If the solid sulfamic acid were added to the reaction mixture at the second predetermined temperature, it is possible that the heat of solution could elevate the temperature to an undesirably high level causing premature further condensation of the resin and thus reducing its water solubility.

When the pH of the alkaline resole solution is adjusted to about 6.5 by addition of sulfamic acid, it is believed that about 85% by weight of the calcium thereby becomes solubilized. The remaining 15% of the calacium may be in the form of an insoluble precipitate, or subsequently form such a precipitate, for example, by reaction with dissolved ambient carbon dioxide to form an insoluble calcium carbonate precipitate. While such a small amount of residual unsolubilized calcium does not generally present a significant problem in use of the aqueous resole resin, if desired substantially all the calcium can be solubilized. This can be accomplished by adding sufficient sulfamic acid to provide an aqueous resole solution having a low pH, such as about 1 or less, and then neutralizing the solution, as by addition of a mono-, di- or trialkanolamine, such as mono-, di-, or triethanolamine, or mixture thereof, to provide a neutral solution, such as a resole solution having a pH of about 7 or slightly greater than 7. The neutralization can be effected by addition of a base which is reactive with the aldehyde such as mono- or diethanolamine. Alternatively, a base which is not reactive with the aldehyde, such as triethanolamine, can be used. It is believed that a solution having a pH of 7 or greater may be somewhat more stable than one having a pH of about 6.5. Thus, these additional steps can be employed when it is desired to produce an especially stable aqueous resole resin solution.

After reduction of the alkalinity of the reaction mixture has been accomplished and the solution has been cooled to 10° C.–15° C., the condensation reaction has been effectively terminated. The resole resin solution maintained in the above temperature range can be packaged, as by drumming, and stored until needed or transferred to a transportation vehicle such as a tank wagon or rail car and shipped to a second site where binder for mineral fiber is to be produced.

The addition of the sulfamic acid to the reaction mixture is believed to result in the formation of a soluble alkaline earth metal sulfamate salt; however, the exact nature of the soluble alkaline earth metal and sulfamate species are not known. Calcium sulfamate is known to be soluble in water.

The aqueous solution of water soluble resole resin produced by the process described above can be used to prepare an aqueous binder for mineral fiber products. Typically, in such products, the binder is sprayed on mineral fibers, such as glass fibers which are then collected as a blanket or a non-woven mat. The characteristics and utility of the products made are determined by the type of mineral fiber, the length and diameter of the fibers, the density of the mat, and the like. For some applications, it may be desirable to weave the fibers or otherwise form a fabric from the fibers.

The aqueous binder is typically prepared by mixing the aqueous solution of phenol-formaldehyde resin with a nitrogenous coreactant and addition of water to adjust the solids.

The nitrogenous reactant can be any nitrogenous substance known in the art to react with phenol-formaldehyde resole resins. Examples of nitrogenous reactants which can be used include urea, thiourea, ammonia, ammonium salts such as ammonium chloride, ammonium nitrate and ammonium sulfate, dicyandiamide, melamine, aminoplast resins such as resins formed by condensation of formaldehyde and an amino or amido compound, such as ureaformaldehyde resins, melamine-formaldehyde resins and dicyandiamide-formaldehyde resins. Urea is a preferred nitrogenous reactant. Preferably, the nitrogenous reactant is added in an amount sufficient to react with substantially all residual formaldehyde in the resole resin. In one presently preferred embodiment, nitrogenous reactants are added in an amount up to about 75% by weight based on the weight of total binder solids.

The aqueous binder can also include other additives such as mineral oil for lubrication and an organo-silane to enhance adhesion of the resin to the mineral fibers. The mineral oil can be added to the binder in the form of an aqueous emulsion. An example of an adhesion-improving silane which can be added is aminoethyl-propyl-trimethoxysilane.

Other additives such as non-reactive organic resins such as Vinsol (trademark of Hercules) resin (derived from rosin), tall oil, surface active compounds such as lignosulfonate salts, thickeners and rheology control agents, dyes, color additives, water, and the like, can also be added to the aqueous binder.

The aqueous binder can be applied to mineral fibers or to a mineral fiber mat or fabric and subsequently dried and cured to form a product. The mineral fiber can be a glass fiber and the mat can be a non-woven mat. The mineral fibers can be continuous or discontinuous. They can take the form of a mineral fiber wool. When glass fiber is used, it can be formed by any conventional process, such as by flame or steam blowing, by centrifugal fiberizing, or the like. The shape, fiber density, fiber lengths, fiber orientation, and like characteristics of the fiber mat depend on the application intended for the products. One especially important application is thermal insulation. In this case, the fiber mats take the form of continuous rolls or batts on non-woven, randomly oriented glass fibers. A similar mat is used in the production of glass fiber batts for acoustic insulation.

When thermal and acoustic glass fiber insulation is to be produced, the aqueous binder is typically sprayed on the fibers prior to their collection in the shape of a mat. Subsequently, the mat with the aqueous binder solution is typically thermally dried to remove water, and the resinous compounds including the resole and the nitrogenous reactant are cured to form an infusible binder for the mineral fiber mat.

When rolls or batts of thermal insulation are produced using glass fibers and a phenol-formaldehyde resole resin prepared by the process of the present invention, the insulation rolls or batts produced exhibit enhanced thickness recovery after compression. This is an important performance property for thermal insulation, as such batts or rolls are typically compressed for shipment after manufacture. Later, before they are installed, the batts or rolls are allowed to recover. In general, the greater the thickness of the batt or roll, the lower the thermal conductivity and the greater the thermal insulation value (R value) provided by the batt or roll. Consequently, because they recover a greater proportion of their original thickness than batts or rolls produced using prior art binders, including phenol-formaldehyde resins, thermal insulation rolls or batts produced according to the present invention provide better insulation than comparable prior art products.

The resole resin of the present invention can also be used to prepare binders for other mineral fiber products such as battry separators, roofing products, reinforced plastics, printed circuit boards, and electrical insulation products as well as for processed wood products such as chipboard, particle board, plywood, and the like. In addition the resole resin can be used in preparing varnishes for printed circuit boards, copper clad laminates, blading for turbines, laminated paper products, and the like, and for inks for ink jet printing and similar applications. In addition the resole resin can be used in the production of rigid closed cellular foams, such as disclosed, for example, in U.S. Pat. No. 4,694,028 for use in thermal insulating boards, and the like.

The following examples are illustrative of the processes and compositions of the present invention and will be useful to those of ordinary skill in the art in practicing the invention. However, the invention is in no way limited by these examples. Unless otherwise indicated all percentages are given on a weight basis in the following examples.

EXAMPLE 1

Preparation of Phenol-Formaldehyde Resins

100 Kg of commercial grade phenol and 223.4 Kg of a 50% (w/w) aqueous solution of formaldehyde are introduced into a reactor. The reactor is heated and the contents are agitated until the temperature of the mixture stabilizes at 45° C. The temperature is maintained at 45° C., and 3.5 Kg of calcium oxide is added at a steady rate over a 30 minute period. Immediately upon completion of addition of the calcium oxide the temperature of the mixture is adjusted to 70°±1° C. within a maximum period of 30 minutes. The temperature is then maintained for about 100 minutes. At a critical time when the free formaldehyde content, evaluated in relation to the weight of the reaction mixture, reaches a value of 10.2±0.1% (w/w), cooling of the reaction mixture is begun. The time when the condition is met is obtained by extrapolation of an experimental measurement of free formaldehyde content at a time of about t+20 minutes ("t" is the time when 70° C. is initially reached). The extrapolation is made using a calibration curve previously determined experimentally for the particular reactor, reaction mixture and reaction conditions used. The calibration curve gives evolution of free formaldehyde as a function of time at 70° C. The contents of the reactor are cooled to 20° C. in 40 minutes or less. The pH of the reactor contents is adjusted by addition of about 9 Kg of 100% sulfamic acid to give a pH of 6.5±0.2, sufficient time being allowed to ensure that the sulfamic acid has completely dissolved before the final pH reading is taken. The resulting aqueous resin solution is stored at 14°±2° C., and has a nominal solids content of 52.0% (w/w), a free phenol content of 1.2% (w/w), a maximum free formaldehyde content of 10.0% (w/w) and is infinitely dilutable with water. The calcium oxide reagent employed is to have an actual calcium oxide content of at least 96.3% (w/3w) and a maximum silicon dioxide contents of less than 0.50% (w/w).

EXAMPLE 2

Preparation of Aqueous Binder 42.4 g of a 46% (w/w) aqueous solution of phenol-formaldehyde resole resin prepared according to Example 1 was mixed with 10.5 g urea and 47.1 g water (65/35 resin solids/urea weight ratio). The resulting binder solution remained clear after 24 hours.

COMPARATIVE EXAMPLE 2A 47.9 g of a 47% (w/w) aqueous solution of phenol-formaldehyde resin prepared by a conventional process (sodium hydroxide catalyst and sulfuric acid neutralization) was mixed with 7.5 g urea, 0.54 g ammonium sulfate, 4.5 g ammonia and 41.4 g water. The resulting binder also remained clear after 24 hours.

COMPARATIVE EXAMPLE 2B

A calcium catalyzed phenol-formaldehyde resole resin was prepared according to the process described in U.S. Pat. No. 4,663,418. To prepare the resin, the process of Example 1 was substantially followed, except that the resin was not neutralized by addition of sulfamic acid. 75.0 g of a 49.6% (w/w) aqueous solution of the resin were mixed with 20.0 g of urea, 22.7 g of ammonia, 9.5 g of a 25% (w/w) aqueous solution of ammonium sulfate, and 71.2 g of water to give an aqueous binder. This binder turned dark green and a precipitate formed after approximately 12 hours.

Dynamic Mechanical Analysis (DMA) was used to compare the curing properties of binders of Example 2 and Comparative Examples 2A and 2B. Test specimens were prepared by soaking a woven fiberglass cloth with aqueous binder and heating at 2° C./min. to a maximum of 180° C. The binder of Comparative Example 2B had a lower cure initiation temperature, while the binders of Example 2 and Comparative Example 2A required approximately the same amount of time for 100% cure.

The same three binders were tested for potential odor by gas chromatography. Samples of the aqueous binder solutions were dried at 105° C. for five minutes, then placed in a sealed bottle with glass fiber and water. The potential odor is determined by sampling the air above the binder for trimethylamine. The area of the peak obtained by GC analysis is an indication of the potential odor. No direct correlation has yet been established between peak area and actual odor from the product, but it is believed that the higher the peak area the greater the possibility that the odor will be generated.

The binder of Comparative Example 2B was found to have a peak area 7.5 times greater than that of the binder of Comparative Example 2A, while the area of the binder of Example 2 was three times less than that of the binder of Example 2A.

The moisture resistance of binders prepared according to Example 2 and Comparative Examples 2A and 2B was determined by observing the effect of moisture on dog bone tensile strength. The test indicates a binder's sensitivity toward moisture, but no direct correlation between effects on dog bone specimens and effect on insulation products has been established. The insulation products have a much greater surface area than the dog bone specimens. The dog bone specimens are prepared by molding test specimens (approximately ¼" thick, 3" long, 1½" wide at ends and 1" wide in the middle of the specimens) using 95% (w/w) sand as filler and 5% (w/w) binder.

Three sets of dog bone specimens were prepared for each binder and cured at 180° C. for 20 minutes. One set was left at ambient conditions while the other two sets were placed in a humidity chamber kept at 50° C. After 24 hours, the ambient condition bones and one set from the humidity chamber were broken. The remaining set was broken after 48 hours in the humidity chamber. The results, summarized in Table I below, indicate that under the conditions of this test, the binder of Example 1 has significant moisture resistance.

TABLE I

| | Specimen weight (g)[1] | | | % Strength[1] retained |
|---|---|---|---|---|
| | Ambient | Humidity | | |
| | 24 hrs. | 24 hrs. | 48 hrs. | after 48 hrs. |
| Example 2 | 268 | 187 | 162 | 60.4 |
| Comparative Ex. 2A | 254 | 220 | 209 | 82.3 |
| Comparative Ex. 2B | 268 | 206 | 204 | 76.1 |

[1]Average of six determinations

EXAMPLE 3

An aqueous binder was prepared substantially according to Example 2, except that mineral oil and an amino silane were also included. The resin for this binder was prepared according to Example 1 except that the reactor is not cooled prior to neutralization and a 25% (w/w) aqueous solution of sulfamic acid was used in place of the 100% solid sulfamic acid. The reaction was then cooled prior to transfer of the contents for storage. The phenol-formaldehyde resin had a soids content of 46.07% (w/w), a pH of 6.47, a specific gravity of 1.197, and a nitrogen content of 0.76% by weight of solid. The aqueous binder had a total solids content of 6.41% (w/w), a pH of 6.87, a specific gravity of 1.020, and a nitrogen content of 15.30% by weight of solids. The binder had a resin content of 65.2% by weight of total binder solids, a urea content of 34.8%, an oil content of 13.2%, and a silane content of 0.17%, each on the same basis.

EXAMPLE 4

An aqueous binder was prepared using an aqueous resole resin solution prepared according to the process of Example 1. The aqueous resole resin had a total solids content of 52.0% (w/w), a pH of 6.80, a specific gravity of 1.220, a residual free phenol content of 1.07% (w/w) and a residual free formaldehyde content of 9.06% (w/w). 1,500 lb. of the aqueous resole resin were mixed with 14,574 lb. of water, 420 lb. of urea, 48 lb. of amino silane solution (1.92 lb. solids) and 282 lb. of mineral oil dispersion (199 lb. mineral oil) to give an aqueous binder having a total solids content of 6.75% (w/w) and having an ash content of 0.20% (w/w).

EXAMPLE I

Preparation of Thermal Insulation Batts

The aqueous binder of Example 3 was used to manufacture unfaced R-30 thermal insulation batts using conventional glass fiber insulation production equipment. A similar product (Comparative Example IA) was manufactured using an aqueous binder prepared according to the process of Comparative Example 2A.

The uncured mat for the Example I product was observed to be softer than the Comparative Example IA uncured mat. The Example I product had a paler color than the Comparative Example IA product. Samples of the products were obtained and tested for thickness recovery (inches) just after manufacture, as well as after 14 days and 30 days storage. The results of those tests are reported in Table II.

TABLE II

| | Initial | |
|---|---|---|
| | Ex. 1A | Ex. I |
| Recovery (inches) | 10.666 | 11.233 |
| Drop[2] | | |

TABLE II-continued

| | 14 Day | | 30 Day | |
|---|---|---|---|---|
| | Comp. Ex. IA | Ex. I | Comp. Ex. IA | Ex. I |
| North[1] | | | | |
| Recovery (inches) Drop[2] | 9.74 | 10.12 | 9.60 | 9.88 |
| South[1] | | | | |
| Recovery (inches) Drop[2] | 9.79 | 10.07 | 9.72 | 9.93 |

[1]Products were produced on two pairs of production lanes and samples were taken from each. One pair of lanes was designated "North" and the other was designated "South."
[2]The "drop" recovery was measured according to ASTM C 167.

Odor potential was also measured and is reported in Table III.

TABLE III

| | North[1] | | South[1] | |
|---|---|---|---|---|
| | Comp. Ex. IA | Ex. I | Comp. Ex. IA | Ex. I |
| Odor Potential (Area Counts)[2] | 98,005 | 23,962 | 163,919 | 43,862 |

[1]Products were produced on two pairs of production lanes and samples were taken from each. One pair of lanes was designated "North" and the other pair was designated "South."
[2]Determined by gas chromotography.

The odor potential of the product of Example I was reduced by a factor of four in comparison with that of Comparative Example IA. The thermal conductivity was also measured using the ASTM C-518 method for residential blanket insulation. Samples were sliced to 3.25" and tested at three test thicknesses at 75° F. mean temperature. K-density curves were calculated from the thermal data so obtained (not shown). The densities of the product of Example I and Comparative Example IA required for R-value certification were found to be comparable.

EXAMPLE II

The aqueous binder of Example 4 was used to prepare Kraft paper-faced rolls (39'2"×15") and batts (15"×48") of R-19 glass fiber thermal insulation. The odor potential of samples of the batts and rolls produced according to this invention was determined after 14 days and 83 days. In each case the odor potential was zero. In contrast, the odor potential of the batt control after 14 days was 350,000 and that of the roll control was 1,440,000. Measurement of drop recovery after 14 days, 30 days and 60 days for the batts and after 30 days and 60 days showed that the thermal insulation products of the present invention had greater thickness recovery than the control materials, the difference in recovery being statistically significant at the 95% confidence level for the 60 day measurements and at the 99% confidence level for the 14 day and 30 day measurements.

Various modifications can be made in the details of the various embodiments of the processes and compositions of the present invention, all within the scope and spirit of the invention and defined by the appended claims.

I claim:

1. A process for preparing a urea-free aqueous solution of a water soluble resole resin having improved storage stability for subsequent use in preparing a binder for mineral fibers, the process comprising:

(a) preparing an aqueous mixture of at least one aldehyde and at least one phenol, the molar ratio of aldehyde to phenol being from about 1.5: 1 to 5.0 : 1;

(b) adding an alkaline earth metal compound to the aqueous mixture in an amount effective to catalyze the reaction between the aldehyde and the phenol;

(c) reacting the aldehyde and the phenol under basic conditions in the absence of urea and in the presence of the alkaline earth metal compound to form a urea-free aqueous solution of a resole resin; and (d) adding sulfamic acid to the urea-free aqueous solution prepared in step (c) to provide a resin solution having improved stability in an amount sufficient to provide a pH from about 1 to 8.

2. A process according to claim 1 wherein at least one phenol is phenol and at least one aldehyde is formaldehyde.

3. A process according to claim 2 wherein the alkaline earth metal is selected from calcium and barium.

4. A process according to claim 3 wherein the alkaline earth metal is calcium.

5. A process according to claim 4 wherein the calcium compound is selected from calcium oxide and calcium hydroxide.

6. A process according to claim 4 wherein the molar ratio of formaldehyde to phenol is from about 3.2 : 1 to 3.8 : 1.

7. A process according to claim 4 wherein the calcium compound is added in an amount from about 1% to 10% by weight, calculated as calcium oxide on the weight of phenol.

8. A process according to claim 7 wherein the calcium compound is added in an amount from about 3% to 6% by weight, calculated as calcium oxide on the weight of phenol.

9. A process according to claim 4 wherein the sulfamic acid is added in an amount sufficient to adjust the acidity of the solution to a pH of from about 6.0 to 7.0

10. A process according to claim 1 wherein the sulfamic acid is added to the resin solution to provide an acidic solution, the solution being subsequently neutralized by addition of a base.

11. A process according to claim 10 wherein the base is selected from monoethanolamine, diethanolamine and triethanolamine, the resin solution being neutralized to a pH of about 7 or greater.

12. A process according to claim 5 wherein the temperature of the aqueous mixture of formaldehyde and phenol is maintained at a first temperature of from about 40° C. to 50° C. as the catalyst is added, the temperature then being adjusted to rise to a second temperature of from about 60° C. to 80° C. within about 30 minutes and maintained until the free formaldehyde content declines to a level of about 10% by weight of the reaction mixture solids.

13. A process according to claim 12 wherein the reaction mixture is neutralized with solid sulfamic acid, the reaction mixture being cooled to between about 30° C. and 40° C. before addition of the sulfamic acid.

14. An aqueous solution of phenol-formaldehyde resin prepared according to process of claim 4.

15. A process for preparing a binder for mineral fibers, the process comprising preparing an aqueous solution of a water soluble urea-free resole resin having improved storage stability, the binder being prepared by a process comprising:

(a) preparing an aqueous mixture of at least one aldehyde and at least one phenol, the molar ratio of the aldehyde to the phenol being from about 1.5 : 1 to 5.0: 1;

(b) adding an alkaline earth metal compound to the aqueous mixture in an amount effective to catalyze the reaction between the aldehyde and the phenol;

(c) reacting the aldehyde and the phenol under basic conditions in the absence of urea and in the presence of the alkaline earth metal compound to form a urea-free aqueous solution of a resole resin;

(d) adding sulfamic acid to the urea-free aqueous solution prepared in step (c) to provide a resin solution having improved stability in an amount sufficient to provide a pH from about 1 to 8, and (e) subsequently adding at least one nitrogenous reactant selected from urea, ammonia, ammonium salts, dicyandiamide, meladine, and aminoplast resins to the urea-free aqueous solution including sulfamic acid.

16. A process according to claim 15 wherein the nitrogenous reactant is urea.

17. A process according to claim 15 wherein the nitrogenous reactant is added in an amount sufficient to react with substantially all residual formaldehyde in the aqueous resole solution.

18. A process according to claim 17 wherein the nitrogenous reactant is added in an amount up to about 75% by weight based on the weight of total solids.

* * * * *

UNITED STATES PATENT AND TRADEMARK OFFICE

CERTIFICATE OF CORRECTION

PATENT NO. : 4,904,516

DATED : February 27, 1990

INVENTOR(S) : Albert W. Creamer

It is certified that error appears in the above-identified patent and that said Letters Patent is hereby corrected as shown below:

On the title page, below "[76] Inventor: Albert W. Creamer, c/o CertainTeed Corporation, P.O. Box 860, Valley Forge, Pa. 19482"

insert -- [73] Assignee: CertainTeed Corporation, Valley Forge, Pa.--.

Column 1, Line 17, delete "rein forcement" substitute therefore -- reinforcements --.

Column 1, Line 18, after the word "circuit" insert -- boards. --.

Column 14, Line 3, delete "meladine" substitute therefore -- melamine --.

Signed and Sealed this

Sixteenth Day of April, 1991

*Attest:*

HARRY F. MANBECK, JR.

*Attesting Officer* *Commissioner of Patents and Trademarks*